Figure 1:
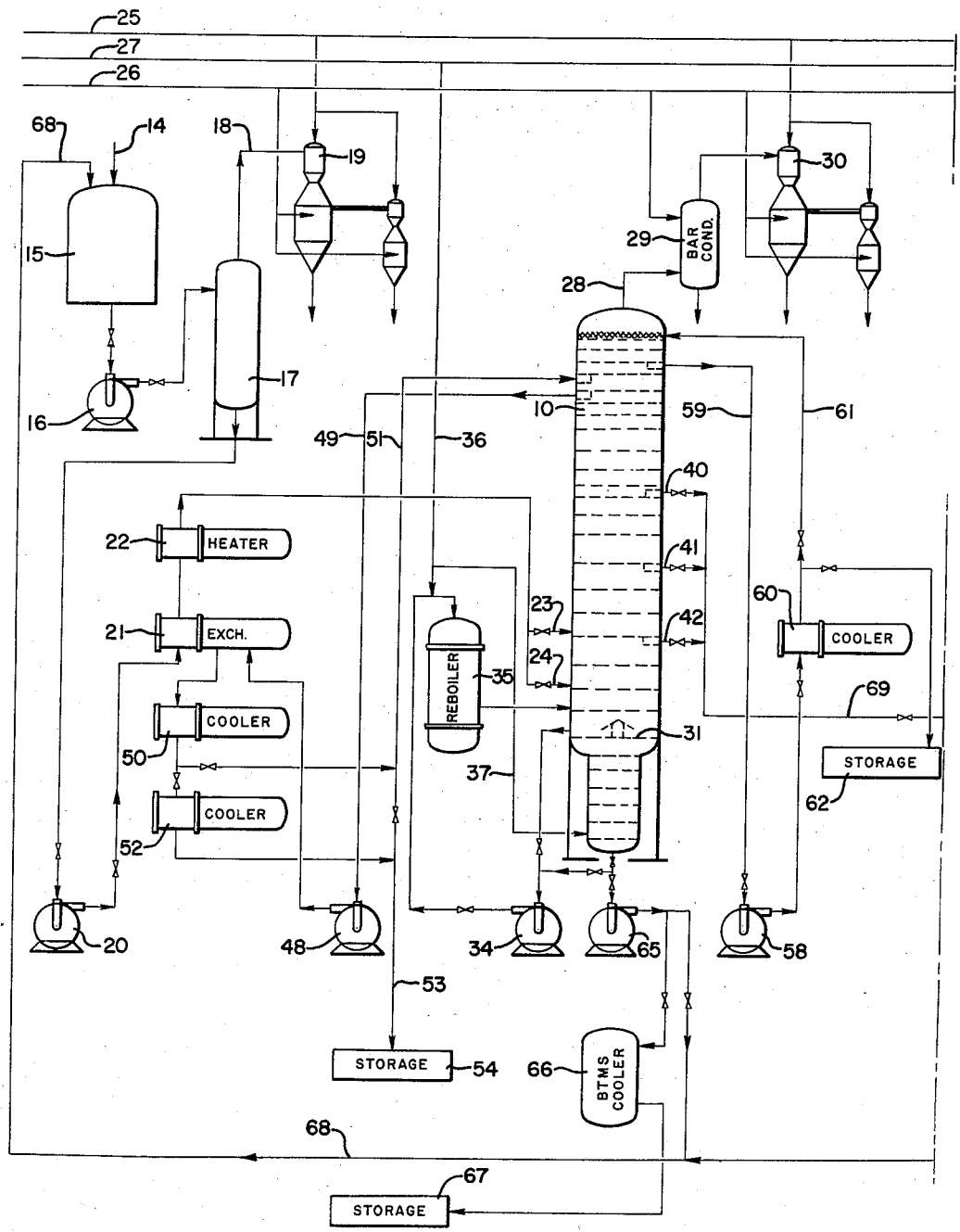
Figure 2:
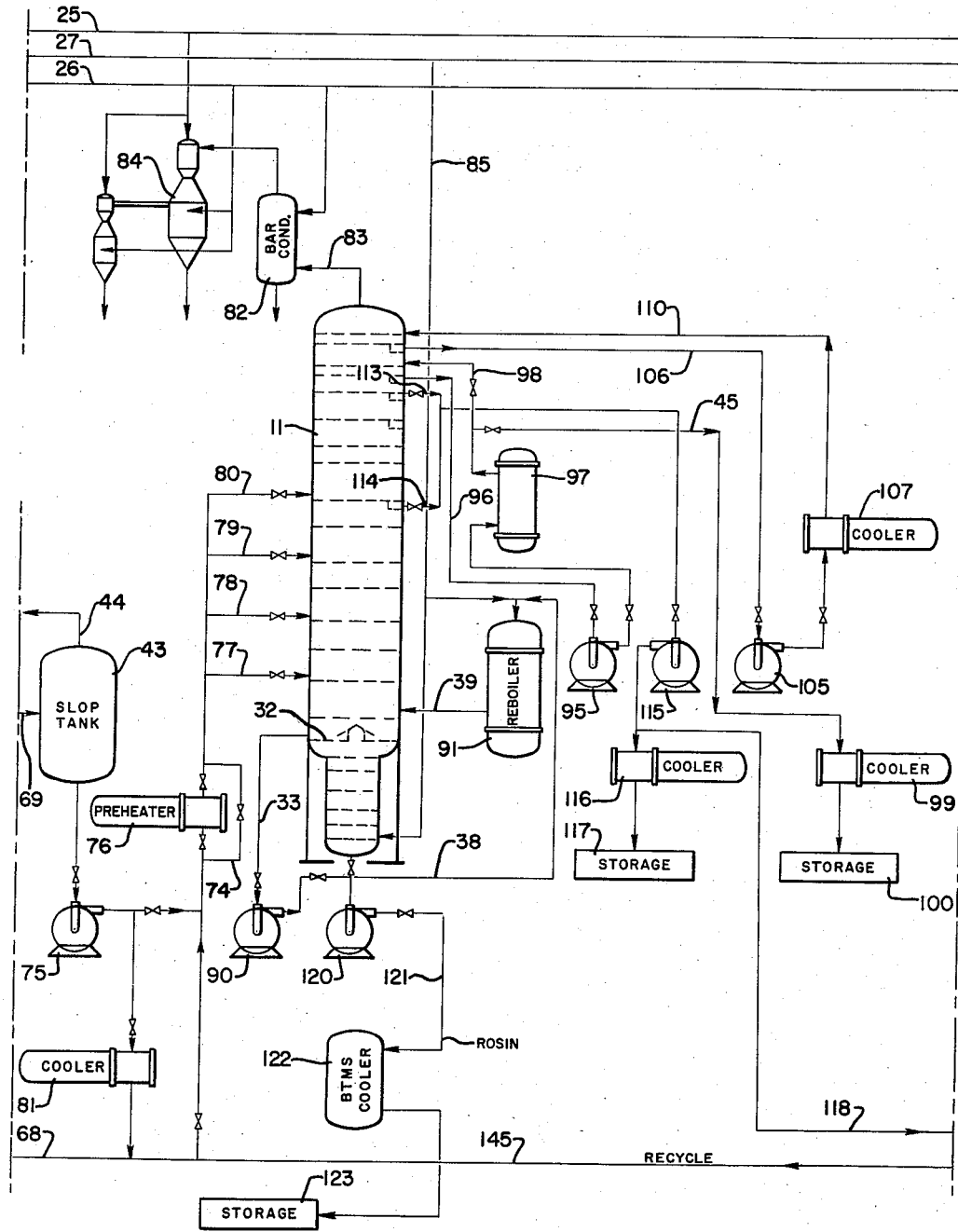

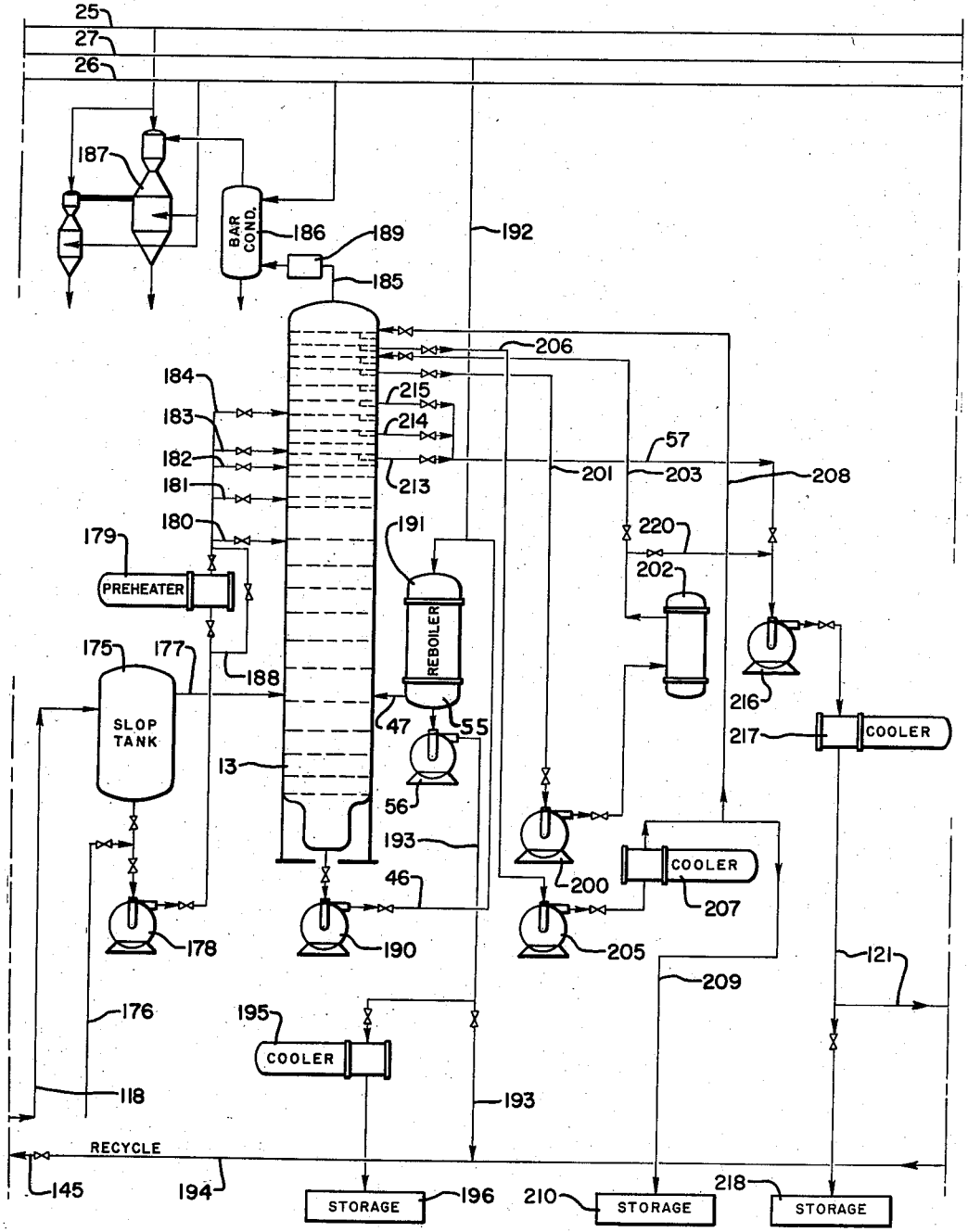

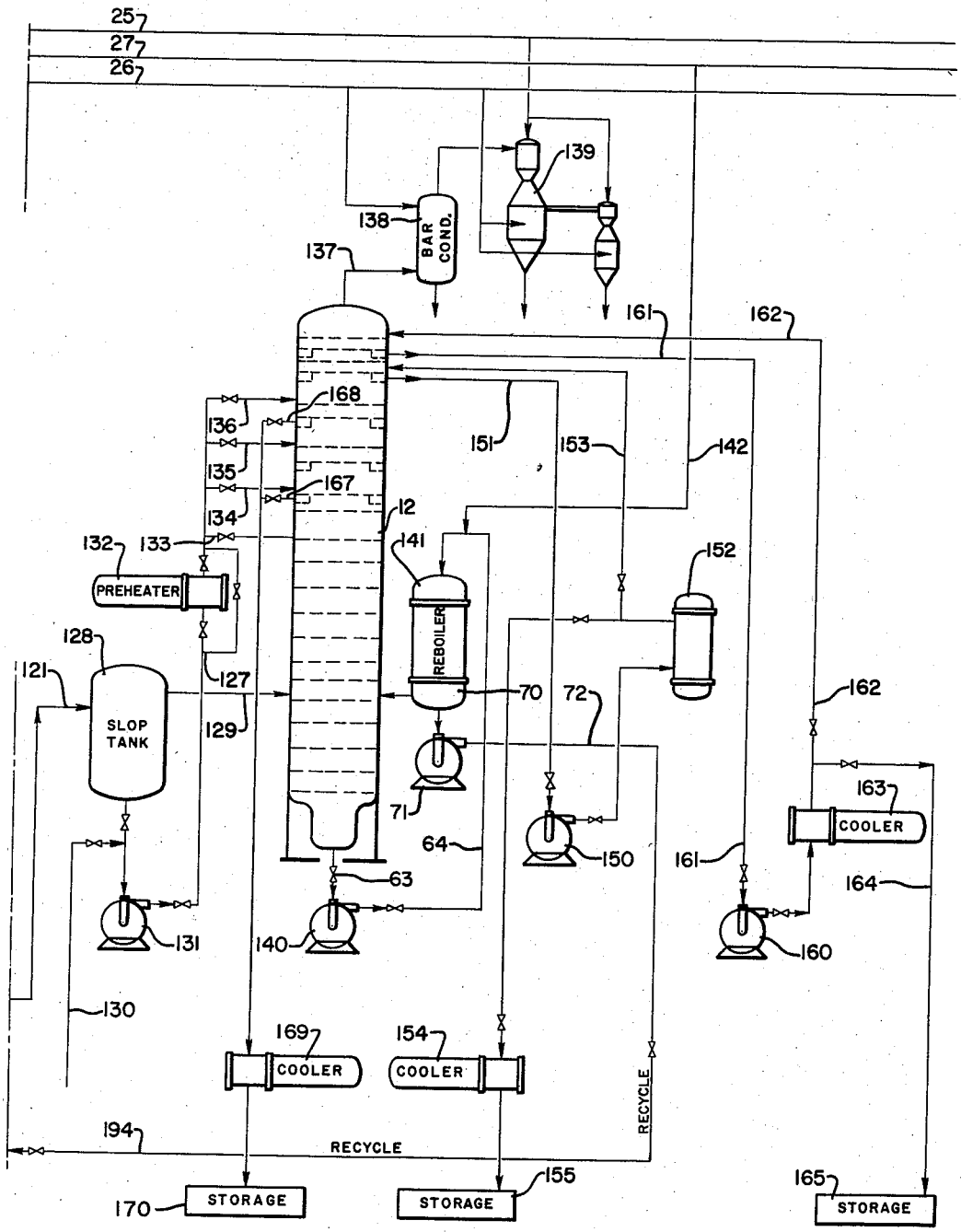

2,886,492
Patented May 12, 1959

2,886,492

TALL OIL FRACTIONATING PROCESS

Elwood W. Hanson, Picayune, Miss., and John Drew and Lloyd Cagnolatti, De Ridder, La., assignors to Crosby Chemicals, Inc., Picayune, Miss., a corporation of Mississippi Application July 17, 1956, Serial No. 598,339

6 Claims. (Cl. 202—52)

This invention relates to an improved method of separating tall oil into its various constituents and, more particularly, to a method of distilling tall oil to obtain therefrom a rosin fraction of high quality and purity and a fatty acids fraction of improved quality and purity.

In the past, it has been known that crude tall oil which contains approximately 35–50% fatty acids, including oleic, linoleic and palmitic acids; 35–55% rosin acids, and 5–10% unsaponifiable and neutral material, could be separated into its constituent parts by the use of vacuum distillation procedures. However, in the case of the processes heretofore used for this purpose, the separation between the various constituents of the tall oil has not been as complete as desired. It is the purpose of the present invention to provide a tall oil fractionating process which will yield a rosin having characteristics comparable with those of wood rosin, of high quality and low fatty acid content, a fatty acid product that is low in rosin content and relatively light in color, various other fatty acid products, as desired, and a pitch high in desirable unsaponifiable materials that may be separated therefrom by further processing.

Accordingly, it is an object of our invention to provide an improved method of fractionating tall oil so as to obtain therefrom products of higher quality and purity than has heretofore been possible by the use of prior art processes.

A further object of our invention is to provide an improved continuous process for fractionating tall oil, in which the crude tall oil is continuously fed into the system at a rapid rate and the tall oil and various fractions thereof are kept in continuous circulation until withdrawn from the system.

It is well known that continued heating modifies the characteristics of rosin and, therefore, it is an object of our invention to provide a process for fractionating tall oil, in which the rosin is separated from the other tall oil ingredients as early in the processing as possible, so that the concentrated rosin is subjected to the minimum amount of heating.

Our improved process comprises, in general, the following treatment procedures:

First, fractional distillation of the crude tall oil to remove the odorous gases and pitch therefrom, producing what we call "refined tall oil"; next, separating and removing the rosin from the other ingredients of the refined tall oil; next fractionating the mixture of rosin acids and fatty acids left after removal of rosin from the refined tall oil to produce fatty acids relatively low in rosin content; finally, subjecting the fatty acid product of the preceding step to further fractionation to reduce the rosin content and remove color bodies, producing as a final product fatty acids substantially free of rosin and of improved light color. By this method, it is possible to continuously recycle fatty acid-rosin acid mixtures from points in the treatment zones where these occur back to the crude tall oil feed tank, so that they may again be subjected to treatment for removal of rosin. The entire process is designed with the object of keeping the material undergoing treatment in continuous circulation, except for those portions being taken off to storage, so as to avoid any decomposition of the material due to localized overheating thereof. It is especially important that the rosin be removed at an early stage of the process.

In the specification to follow, a complete and detailed discloseure of one possible form or embodiment of our invention will be given in connection with the acompanying drawings wherein there is shown a flow sheet diagram of the tall oil treatment process.

In the drawings:

Figs. 1–4, together, comprise a complete flow sheet diagram of the tall oil treatment process.

The fractionating equipment herein shown, for carrying out our improved tall oil treatment process, includes four fractionating towers or columns. In the first column, indicated by reference numeral 10 in Fig. 1 of the drawings, the odorous gases and pitch are removed from the crude tall oil, together with a small percentage of light fatty acids, if desired, thereby producing a tall oil which is substantially free from odorous gases and pitch. We refer to this as "refined tall oil." In the second column, designated in Fig. 2 by reference numeral 11, rosin is separated and removed from the refined tall oil. The mixture of rosin acid and fatty acid remaining is then delivered to column 13 (Fig. 3) where fatty acids are separated from rosin acids to produce a fatty acids product relatively low in rosin content. This fatty acids fraction is delivered from column 13 to column 12 (Fig. 4) where a further separation is made between the fatty acids and rosin acids and color bodies, to thereby produce fatty acids products which are substantially free from any of the other ingredients of the crude tall oil and of light color. A portion of the bottoms liquid from the column 12, comprising a rosin acids-fatty acids mixture, is recycled to column 10, and mixed with the feed therefor for further treatment. Likewise, a portion of the bottom product from column 13, comprising a rosin acids-fatty acids mixture, is recycled to the feed tank for column 10 for repeated treatment in the process. The general nature and purpose of the treatment process and the equipment therefore having been briefly described, a detailed description of the complete process will now be given.

Referring to Fig. 1 of the drawings, the crude tall oil is drawn from a storage tank 15 by a pump 16 and passed into a degasifier 17, where any occluded gases in the tall oil are removed through a line 18 connected to a steam ejector pump 19. The pump is operated by high pressure steam drawn from a line 25 and functions to maintain a reduced pressure in the degasifier and to evacuate any gases released by the tall oil therein. Cooling water for the pump 19 is obtained from a line 26 through which well water is circulated. Tank 15 may be supplied through line 14 and through a recycling line 68. The crude tall oil is drawn from the degasifier 17 by a pump 20 and passed through a heat exchanger 21, which raises the temperature of the crude tall oil feed stock to 320° F. The feed stock is next passed through a heater 22 which raises the temperature to 480° F. and the hot feed stock is then delivered through lines 23 and 24 to the fractionating zone of the column 10. The heater 22 is preferably of the Dowtherm type, wherein the feed stock passes through a nest of tubes surrounded by a shell containing diphenyl and diphenyl oxide vapors, the liquid feed stock flowing horizontally through the tubes. The vapors are condensed on the exterior surfaces of the tubes and give up their heat of condensation to the feed stock liquid to be heated. The condensed diphenyl and diphenyl oxide passes out from the other end of the shell.

The column 10 is preferably of the type having a reflux zone containing bubble cap cooling trays, a central zone containing bubble cap fractionating trays, and a lower zone containing bubble cap stripping trays. A wire screen mist extractor is desirably provided in the top of the column above the uppermost cooling tray to prevent loss of fatty acids from the top of the column in the form of mist. A collecting tray 31 is provided between the lowermost fractionating tray and the uppermost stripping tray to receive the higher boiling point liquids which pass downwardly through the column. The stripping trays are supplied with liquid by overflow from the collecting tray, which is so constructed as to permit vapors from the stripping section to pass upwardly through it.

At its upper end, the column 10 is connected by a pipe 28 with a barometric condenser 29 which is connected to a steam ejector pump 30. By this means, the pressure at the top of the column 10 is maintained at about 37 mm. of mercury and the gases leave the top of the column through the pipe 28 at a temperature of about 180° F. The pressure within the column where the lines 23 and 24 enter lies in the range of from 88 mm. to 100 mm. of mercury.

Column 10 is provided with a reboiling circuit which includes a pump 34 and reboiler 35. The pump withdraws liquid from the collecting tray 31 and delivers it into the top of the reboiler 35 after which it passes downwardly through tubes surrounded by hot vapors that condense on the outer surfaces of the tubes. After being thus heated, the liquid is returned to the bottom of the fractionating zone just above the collecting tray. The function of the reboiling circuit is to supply heat for vaporization in the operation of the fractionating column. In passing through the reboiler, the liquid is mixed with low pressure, superheated steam at approximately 550° F., which is taken from a supply line 27 and delivered to the top of the reboiler through a line 36. Low pressure steam from line 27 is also supplied to the bottom of the stripping section of column 10 through a line 37 so as to strip rosin and fatty acid components from the pitch and neutral material descending through the stripping section. The pitch and neutral material may also be drawn, if desired, from the bottom of the column by pump 34 and circulated through the reboiler, after being mixed with steam, whereupon it is returned into the column above the collecting tray.

Refined tall oil is removed from the fractionating section of column 10 through lines 40, 41 and 42, or any one ore more of them, and delivered through line 69 into a slop tank 43 which is maintained at the reduced pressure prevailing in column 10 by a vent line 44 connected with the column.

As herein shown, column 10 is provided with two reflux circuits, one of which includes a pump 48 which withdraws liquid, comprising light fatty acids, through line 49, from one of the upper fractionating trays and forces it through the heat exchanger 21 and a cooler 50. About 97% or more of the liquid is returned to the uppermost fractionating tray of the column through a line 51, while the remainder of the liquid, if any, is passed through a cooler 52 and delivered through a line 53 to a storage tank 54. The second reflux circuit includes a pump 58 which withdraws light fatty acid liquid from the lowermost cooling tray through a line 59 and passes it through a cooler 60. More than 99% of the cooled light fatty acid liquid is returned as reflux to the column above the cooling trays through a line 61 and the remainder is delivered to a storage tank 62.

The steam introduced into the column, together with the odorous, non-condensable gases, are removed from the top of the column through the barometric condenser 29. Pitch, consisting largely of unsaponifiable material, is pumped by pump 65 through a bottoms cooler 66 into a storage tank 67, or passed on for further processing to recover valuable ingredients of the pitch. Part of the pitch may be delivered through a line 68 to the crude oil feed tank 15 for recycling.

The refined tall oil delivered into slop tank 43 from column 10 is next passed into column 11, where the rosin is substantially separated from the fatty acids. Column 11 is similar in construction to column 10 and includes a plurality of cooling trays in the upper portion of the column, a number of fractionating trays in the intermediate portion of the column, and a series of stripping trays in the bottom portion of the column. A collecting tray 32 is located below the bottommost fractionating tray and above the uppermost stripping tray. The feed stock for the column 11 is refined tall oil taken from the slop tank 43 by a pump 75 and passed through a preheater 76 where the temperature of the oil is raised to about 500° F. after which it is delivered to column 11 at any one or more of a plurality of levels by lines 77, 78, 79 and 80. The preheater is arranged to be bypassed by a line 74 should this be desirable. A portion of the refined tall oil from slop tank 43 may, upon starting up the plant, be passed through a cooler 81 and thence into line 68 for recycling through column 10.

The top of column 11 is maintained at a reduced pressure of about 30 mm. of mercury by means of a barometric condenser 82 which is connected by a line 83 with the top of the tower. A steam ejector pump 84 serves to evacuate the barometric condenser. The pressure within the column at the points of entry of lines 77, 78, 79 and 80 lies within the range of from 74 mm. to 114 mm. Low pressure steam from line 27 is supplied to the bottom of the column below the lowermost stripping tray through a line 85. Steam, together with any non-condensable gases, is removed from the top of the tower through the line 83 and the condenser 82.

A reboiling circuit including line 33, pump 90, line 38, reboiler 91 and line 39 is provided for heating the liquid caught by the collecting tray and returning it to the column above the collecting tray, after admixture with low pressure steam from the line 85. The reboiler is preferably of the Dowtherm type and the liquid to be heated is passed downwardly therethrough along with low pressure steam obtained from the line 85.

Column 11 is provided with two reflux circuits, one of which includes a pump 95 which withdraws liquid from one of the cooling trays through a line 96 and passes it through a heat exchanger 97 where the liquid is cooled. Thereafter, the cooled liquid is returned to a higher cooling tray of the column by a line 98. At times, a small part of the liquid may be diverted through line 45 to a cooler 99 after which it is passed into a tank 100 for storage as light fatty acids. In the second reflux circuit, a pump 105 withdraws liquid from one of the cooling trays, through line 106, and passes it through a cooler 107 after which the liquid is returned to the column above the uppermost cooling tray through a line 110.

A side stream consisting of a mixture of fatty acids and rosin acids is withdrawn from an intermediate portion of the tower through lines 113 and 114 by a pump 115 and passed through a line 118 to column 13 to provide the feed for that column, or, in some instances, liquid may be withdrawn from line 118 and passed through a cooler 116 into a storage tank 117.

Rosin may be withdrawn from the bottom of column 11 by a pump 120 and delivered through a line 121 and a cooler 122 to a storage tank 123, or passed on for further rosin processing.

The fatty acid refining column 13 (Fig. 3) receives its principal feed from the column 11 through line 118 which delivers the mixture of fatty acids and rosin acids from column 11 into a slop tank 175. The feed for column 13 may also be obtained from previously stored materials through a line 176. The slop tank is connected by a vent line 177 with the power portion of column 13 so as to maintain the pressure in the slop tank approximately equal to that prevailing in the column. Liquid is withdrawn from the slop tank 175, or from the line 176, by a pump 178 and passed through a Dowtherm preheater 179, where the temperature of the liquid is raised to from 400° F. to 500° F. The preheater 179 may be bypassed by means of a line 188, if the material delivered is at a sufficiently high temperature for direct introduction into the column. The heated feed stock is then delivered to intermediate fractionating trays of column 13 through one or more of the lines 180, 181, 182, 183 and 184. The construction of column 13 is similar to that of column 12 and consists of fractionating trays throughout the length of the column except for the upper portion thereof where cooling trays are provided to permit refluxing of the top product.

A reduced pressure of from 10 to 15 mm. of mercury is maintained at the top of the column through a line 185 connected through a booster ejector 189 to a barometric condenser 186 which is evacuated by a steam ejector pump 187. The pressure within the column at the points of admission to feed stock through lines 180 to 184, inclusive, lies within the range of from 18 mm. to 40 mm.

A reboiling circuit is provided for column 13, this circuit including a pump 190 and a reboiler 191, preferably of the Dowtherm type. Liquid withdrawn from the bottom of the column by pump 190 is delivered, through line 46 to the top of the reboiler 191, together with low pressure steam supplied from line 27 through a line 192. After passing through the reboiler 191, the steam, vapors and part of the liquid are returned through line 47 to one of the fractionating trays in the lower portion of the column 13. There is a sump 55 in the lower part of reboiler 191, maintaining a pool of liquid from which pump 56 withdraws liquid delivered through a line 193 into a recycle line 194, or, alternatively, a portion of the liquid may be delivered from line 193 through a cooler 195 into a storage vessel 196. The material delivered into the recycle line 194 will consist of a mixture of rosin acids and fatty acids and may be delivered thereby to the recycle line 145 (Fig. 2) and thence through line 68 to the crude tall oil feed tank 15 (Fig. 1).

There are two reflux circuits for column 13, one of these including a pump 200 which withdraws liquid from a cooling tray in the upper portion of column 13 through a line 201 and delivers it into a heat exchanger 202, where the liquid is cooled. A large part or all of the cooled liquid is then returned to a higher cooling tray in the column through a line 203, as reflux liquid. The other reflux circuit includes a pump 205 which withdraws liquid from one of the uppermost cooling trays in the column through a line 206 and passes it through a cooler 207, after which a large part or all of it is returned through a line 208 to the uppermost cooling tray of the column. A portion of the cooled liquid may be withdrawn through a line 209 to a storage vessel 210, the liquid comprising light fatty acids.

A side stream may be taken from column 13 by means of delivery lines 213, 214 or 215, which are adapted to receive liquid from certain of the intermediate fractionating trays of the column. This side stream, comprising fatty acids, is passed by a pump 216 through line 57 and a cooler 217 and into line 121 leading to the slop tank 128 (Fig. 4) for column 12. A small part may be diverted from line 121 to a storage tank 218. Liquid from line 203 may be diverted through bypass line 220 to line 57 leading to the intake of pump 216.

Column 12 (Fig. 4) is the fatty acid finishing column and, as previously indicated, is designed to produce as a main product, fatty acids low in unsaponifiable materials, substantially free of rosin, and very light in color. This column is constructed to contain a large number of fractionating trays, and above them a fewer number of bubble cap cooling trays. The feed stock for this column is a mixture of rosin acids and fatty acids received from column 13, or from storage. As shown in Fig. 4, a slop tank 128 is provided to supply the feed for column 12, this tank being vented through a line 129 to the lower portion of column 12, so that the pressure in tank 128 is substantially the same as that maintained in the lower portion of the column. Liquid from the tank 128, or from a storage line 130, is delivered by a pump 131 to a preheater 132, where the temperature of the liquid is raised to about 480° F., or the preheater may be bypassed by means of a line 127. The heated liquid is then delivered to any one or more of a plurality of preselected intermediate fractionating trays of column 12 through lines 133, 134, 135 and 136. A reduced pressure of about 35 mm. of mercury is maintained at the top of column 12 by means of a line 137 connected to a barometric condenser 138 which is evacuated by a steam ejector pump 139. The pressure within the column, at the locations of the trays where the lines 133, 134, 135 and 136 enter, lies within the range of from 58 mm. to 71 mm.

The column is provided with a reboiler circuit in which a pump 140 draws liquid from the bottom of the column through line 63. This liquid, which is a mixture of rosin acids and fatty acids, is forced by pump 140 through line 64 and downwardly through the reboiler 141 together with low pressure steam supplied through line 142 and mixed therewith. The heated mixture of fatty acids, rosin acids and steam is then returned, in large part, to an intermediate fractionating tray in the lower portion of the column. A part of the mixture of fatty acids and rosin acids collects in a sump 70 in the lower portion of the reboiler, is withdrawn therefrom by pump 71 and passed through line 72 to line 194 by which it is recycled through lines 145 and 68 to the crude tall oil feed tank 15 (Fig. 1).

There are also two reflux circuits for the fatty acid finishing column, one of these including a pump 150 which withdraws liquid from a cooling tray in the upper portion of column 12 through a line 151 and passes it through a heat exchanger 152. 99% or more of cooled liquid is then returned to a higher cooling tray in the column through a line 153. The remainder of the cooled liquid leaving the heat exchanger 152 is passed through a cooler 154 and delivered to a storage receptacle 155 as light fatty acid. The other reflux circuit for the column 12 includes a pump 160 which withdraws liquid from one of the upper cooling trays through a line 161 and returns it to a higher cooling tray through a line 162 after it has been passed through a cooler 163 to reduce the temperature of the liquid. A portion of the cooled liquid from cooler 163 may be drawn off through a line 164 and delivered into a storage vessel 165, where it is collected as light fatty acid and unsaponifiable material.

A side stream may be withdrawn from intermediate fractionating trays of column 12 through either or both of a pair of lines 167 and 168 and passed through a cooler 169 into a storage vessel 170, where the main product is collected, consisting of fatty acids.

The tall oil fractionation process herein described is a continuous one in which the material is kept in circulation through the various stages of the process by suitable pumps, whereby modification or decomposition of the material due to prolonged heating is avoided. The crude tall oil feed stock is first passed through a degasifier, where occluded gases are eliminated, and then heated to the desired temperature and admitted to fractionating column 10, which may be called the tall oil refining column. In that column, the pitch and neutral material, including unsaponifiables, are removed as a bottom product, while the odorous, non-condensable gases pass off from the top of the tower, with the steam. Some small amount of light fatty acids may be withdrawn to storage from the reflux lines. The most of the material, which we prefer to call refined tall oil, is removed from intermediate fractionating trays of the column and constitutes the feed for column 11, to which it is admitted after heating to the desired temperature. Rosin is removed from the bottom of that column and sent to storage, or further processing. This rosin is substantially free of fatty acids and its specific rotation is low or negative, since it has not been subjected to prolonged heating but has been removed from the system at an early stage. Steam and non-condensable gases are removed from the top of the tower. A small amount of liquid may be diverted from one of the reflux circuits to storage as light fatty acids. A mixture of fatty acids and rosin acids is removed from intermediate trays of column 11 and passed to the feed tank for column 13, in which it is subjected to further fractionation to eliminate rosin acids from the fatty acids. Column 11 may be called the rosin column, since all the rosin removed from the system comes from the bottom of that column.

The feed stock for column 13, a mixture of fatty acids and rosin acids coming from column 11, is heated to the desired temperature, if necessary, and delivered to intermediate fractionating trays of column 13, the reduced pressure in which is somewhat lower than in the other columns. Liquid is withdrawn from the bottom of the column to a reboiler where it is heated and mixed with superheated steam and then, in large part, returned to the column. However, a part of this liquid, comparatively rich in rosin acids, is diverted from the reboiler and returned to the feed tank for column 10, for recycling. A small amount of liquid may be removed from one or the other of the reflux circuits to storage as light fatty acids. The major portion of liquid removed from column 13 is taken from intermediate trays of the tower and delivered to the tank feeding column 12. Since the principal function of column 13 is to reduce the rosin acids content in the mixture of fatty acids and rosin acids, it may be called the fatty acid refining column.

The mixture of fatty acids and rosin acids coming from column 13 is heated to the desired temperature, if necessary, and admitted to intermediate fractionating trays of column 12. A mixture of fatty acids and rosin acids, containing more rosin acids than is desirable, is withdrawn from the bottom of column 12 to a reboiler circuit, but part of this liquid is withdrawn from the reboiler circuit and sent back to the feed tank for column 10, for recycling. A small portion of liquid may be withdrawn from one or the other of the reflux circuits and stored as light fatty acid and unsaponifiable material. The main product is withdrawn from intermediate fractionating trays of column 12 and consists of fatty acids low in unsaponifiable materials, substantially free of rosin, and very light in color due to elimination of color bodies in the process. Column 12 may be called, appropriately, the fatty acid finishing column.

It has been found that the above-described process, in which the materials are constantly maintained in circulation during treatment, is highly efficient and is productive of rosin and fatty acids of better quality and higher degree of purity than have hereto been obtainable in commercial quantities by any previously known tall oil fractionating processes.

While we have described our invention in connection with one particular embodiment thereof and have used, therefore, certain specific temperatures, pressures and apparatus limitations herein, it is to be understood that the present disclosure is illustrative rather than restrictive and that changes and modifications may be resorted to without departing from the spirit of our invention or the scope of the claims, which follow.

Having thus described our invention, what we claim as new and useful, and desire to secure by Letters Patent is:

1. The process of fractionating tall oil which includes the continuous and uninterrupted steps of removing pitch and odorous gases from crude tall oil by a fractional distillation to obtain refined tall oil, removing rosin from said refined tall oil by fractional distillation to obtain a mixture of fatty acids and rosin acids, and separating the fatty acids from the rosin acids by subjecting said mixture to further fractional distillations.

2. The process of claim 1 in which the tall oil and the mixture of fatty acids and rosin acids are continuously circulated throughout the entire process.

3. The process of claim 2 in which fractions consisting of a mixture of fatty acids and rosin acids, high in rosin content, are returned and mixed with the crude tall oil for recycling through the steps of the process.

4. The continuous process of fractionating tall oil comprising the steps of removing pitch and odorous gases by fractionally distilling crude tall oil to produce refined tall oil as a first intermediate fraction, continuously removing rosin from said fraction by fractionally distilling said first refined fraction to obtain a mixture of fatty acids and rosin acids as a second intermediate fraction, fractionally distilling said second mixture fraction to obtain a third intermediate fraction of relatively low rosin content and a fourth lower fraction of higher rosin content, fractionally distilling said third low-rosin intermediate fraction to obtain as a fifth upper fraction fatty acids substantially free of rosin and a sixth lower fraction containing rosin, and continuously removing said fifth upper fraction as a fatty acid product.

5. The process of claim 4 in which the fourth lower fraction from the third fractional distillation step is returned to and mixed with crude tall oil fed to the first fractional distillation step for recycling.

6. The process of claim 5 in which the sixth lower fraction from the final step is returned to and mixed with the crude tall oil fed to the first step for recycling.

References Cited in the file of this patent

UNITED STATES PATENTS

| | | |
|---|---|---|
| 2,296,952 | Ross et al. | Sept. 29, 1942 |
| 2,674,570 | Potts | Apr. 6, 1954 |
| 2,688,590 | Sisson et al. | Sept. 7, 1954 |
| 2,716,630 | Spangenberg et al. | Aug. 30, 1955 |
| 2,724,709 | Spence | Nov. 22, 1955 |